United States Patent
Lim

(10) Patent No.: US 7,259,734 B2
(45) Date of Patent: Aug. 21, 2007

(54) MULTI-SCANNING CONTROL PROCESS AND LED DISPLAYING DEVICE

(76) Inventor: Jae-Jin Lim, 1584-3 Seocho-Dong Seocho-Gu, SEAM Bldg. 3rd Floor, Seoul (KR) 137-877

( * ) Notice: Subject to any disclaimer, the term of this patent is extended or adjusted under 35 U.S.C. 154(b) by 349 days.

(21) Appl. No.: 10/442,830

(22) Filed: May 21, 2003

(65) Prior Publication Data

US 2004/0164936 A1    Aug. 26, 2004

(30) Foreign Application Priority Data

Feb. 13, 2003   (KR) ...................... 10-2003-0009246

(51) Int. Cl.
 *G09G 3/30* (2006.01)
(52) U.S. Cl. ........................... 345/76; 345/82; 345/83; 345/100
(58) Field of Classification Search ................. 345/76, 345/82–83, 100
See application file for complete search history.

(56) References Cited

U.S. PATENT DOCUMENTS 6,570,548 B2 *  5/2003  Smith ........................... 345/83

2002/0186849 A1 * 12/2002 Duffy ........................... 381/58
2003/0218618 A1 * 11/2003 Phan ........................... 345/629

\* cited by examiner

*Primary Examiner*—Richard Hjerpe
*Assistant Examiner*—Leonid Shapiro
(74) *Attorney, Agent, or Firm*—GWiPS

(57) ABSTRACT

An electric displaying device for utilizing a multi-scanning control process comprises: a plurality of the pixel units having basic four LEDs (green, red, blue and 2nd green); pixel drivers to control the pixel units; driver controllers to control the pixel drivers; each LED connected independently to the pixel driver and driver controller; pixel-driving cells; pixel-driving blocks; and receiving boards for accessing the image data and control signal to the pixel-driving blocks. A control process for multi-scanning on the electric displaying device comprises: multi-scan card splits and distributes the image and control signal by sections; receiver board addresses the RGB image data and control signal to the pixel-driving blocks for accessing each pixel unit; two phase signals, "phase0" and "phase1" composed with four phase stages, phase-A, -B, -C and phase-D to generate basic images and intensifying image data by overlapping neighboring LEDs; and alternating the image data and control signals through the entire screen.

11 Claims, 14 Drawing Sheets

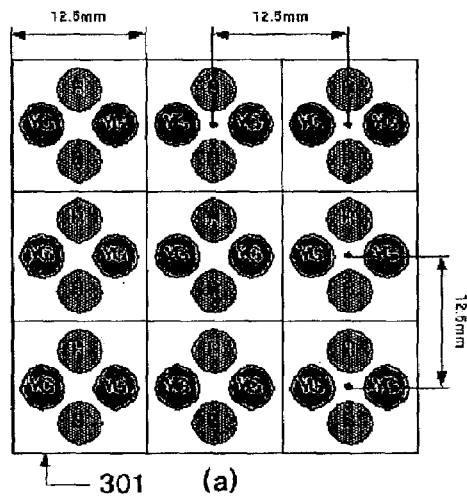
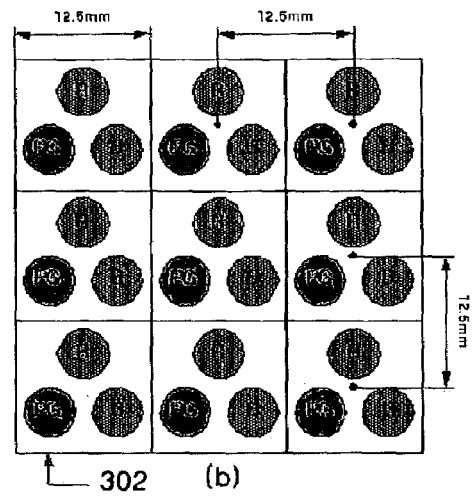
Fig. 3a (Prior Art)　　　　　Fig. 3b (Prior Art)
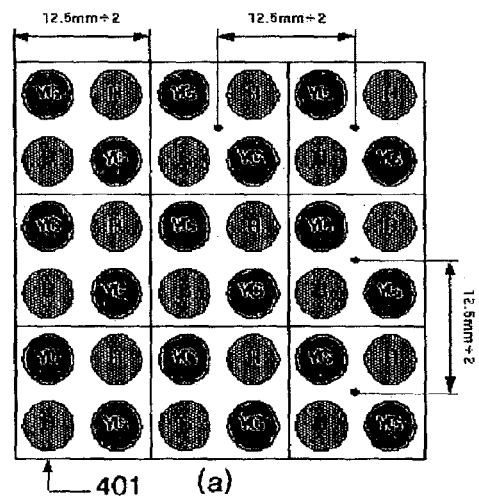
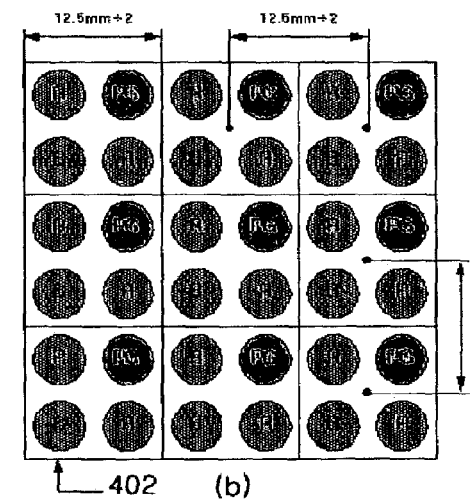
Fig. 4a　　　　　　　　　　Fig. 4b

MULTI-SCANNING CONTROL PROCESS AND LED DISPLAYING DEVICE

BACKGROUND OF THE INVENTION

1. Field of the Invention

The present invention relates to a multi-scanning control process and LED display board utilizing the multi-scanning control process. More particularly, multi-scanning control is performed by sequentially overlapping horizontally and vertically neighboring LEDs of pixel units to intensify the resolution rate per pixel unit through a multi-scan card, a receiver board and pixel drivers.

2. Related Prior Art

Generally, an electric displaying device (201) is assembled with a plurality of LED modules (202), basic LED panels (203) and pixel units (204) to have appropriate brightness (a minimum of 5,000 to a maximum of 8,000 cd/m$^2$ for an outdoor screen, and a minimum of 1,000 to a maximum of 3,000 cd/m$^2$ for an indoor screen) at a fixed pitch (generally 10 mm, 12.5 mm, 14 mm, 15 mm, 16 mm, 20 mm, etc.). The pixel units (204) consist of three primary colors—red, green and blue LEDs. A LED panel (203) having a plurality of pixel units (204) is the basic unit for assembling the electric displaying device (201). Furthermore, a plurality of LED panels (203) is fabricated to form a LED module (202), so that it is convenient to assemble the final screen (201). As seen in FIG. 2, a typical screen (201) displaying an image with a resolution of 320×224 is assembled from a plurality of LED modules (202) with a resolution of 32×32, basic LED panels (203) with a resolution of 16×8, and pixel units (204) formed from a set of LEDs. In the case of the exemplary screen, the pixel unit is formed from two red LEDs, one green LED and one blue LED.

Usually, an electric displaying device utilizing a conventional single-scanning process emits a pre-set resolution fixed by the screen size. As seen in FIG. 1, all LED panels of 8×8 (101), 16×8 (102), 16×16 (103) and 32×16 (104) have the same resolution rate per pixel unit due to the single-scanning process. The brightness and resolution of each panel is proportionate to the size and area of the pixel panel. That is, the brightness and resolution of a conventional screen is fixed at the manufacturing stage by the size of the pixel panel. In other words, when a pixel unit (204) is represented as a dot, the resolution rate per pixel unit or dot rate per unit size and area of pixel panel is 1:1. Therefore, the resolution rate per pixel unit of each 8×8 LED panel (101), 16×8 LED panel (102), 16×16 LED panel (103) and 32×16 LED panel (104) is the same, and the overall resolution is proportionate to the size and area of each LED panel. The various arrangements (105) of LED pixels are presented as examples.

Generally, a basic LED panel (203) has a size of 16×8 resolution. Therefore, an LED module (202) of 32×32 resolution is fabricated with eight basic LED panels (width 2×length 4). Usually, 70 LED modules (width 10×length 7) are required to produce a screen (201) of 320×224 resolution. That is, 560 basic LED panels (width 20×length 28) or 71,680 pixel units or dots (width 320×length 224) are required to produce a screen.

Although conventional technology may satisfy the required screen resolution, it has a technical limitation due the fixed resolution rate per pixel unit. If a high-resolution screen is required, the screen size should be increased to meet the requirement. To accomplish this, however, the number of basic LED panels must be increased, which therefore raises the product cost. Furthermore, the source of image data and the control signal, as well as the capacities of the controlling device, should be increased as the screen size is increased in order to meet the optimum resolution and displaying condition.

As shown in FIGS. 1e, 3a and 3b, the various arrangements of LEDs for the pixel unit are introduced. For example, a pixel unit adopting two yellow-green LEDs is arranged within a lozenge shape, as seen in FIG. 3a. A pixel unit adopting a pure green LED is arranged within a triangle shape, as seen in FIG. 3b. Usually, a pitch of 12.5 mm is used for arranging the LEDs in the pixel unit of the conventional single-scanning method.

The pixel unit of the conventional method has limited resolution due to the fixed size and number of LEDs in the pixel unit. Because of limited resolution, the conventional screen is for outdoor use, which requires more than 15 m of visual distance. Generally, the conventional screen is not suitable for indoor use, which requires high resolution.

A PDP as a displaying device used for advertisement has 600 cd/m$^2$ of illumination and 5000 hours of lifespan. A projector has 1000 cd/m$^2$ of illumination and 3000 hours of lifespan. Contrarily, an electric displaying board configured with four LEDs per pixel unit has 5000 cd/m$^2$ of illumination and 50,000 hours of lifespan. Although the LED displaying board has the great advantages of high illumination and long lifespan, it cannot be applied to an indoor screen due to the requirements of short visual distance, high resolution rate and high production cost.

Referring to FIG. 5a and FIGS. 6 through 8, an operation of the conventional single-scanning process is disclosed along with the configuration of the pixel unit, the signal flow of a single-scan card, receiver board and pixel driver.

The conventional single-scanning process has a 1:1 resolution rate per pixel unit. The conventional processor equips a control board comprising a scan card, a receiver board and a pixel driver board for controlling the RGB LEDs. Although more than one same color LED exists in the conventional pixel unit, the same color LEDs are connected in parallel to a common pixel driver, as seen in FIG. 8. That is, the red LED is connected to the red pixel driver. Two green LEDs are connected in parallel to a common green pixel driver. The blue LED is connected to the blue pixel driver. So, the common green pixel driver controls two green LEDs, at the same time.

Referring to FIG. 6, the single-scan card (60) of the conventional process receives an RGB signal and control signal from the control PC and distributes the received control signal, R/G data and G/B data to each receiver board (70). The single-scan card (60) comprises a video memory (61), a data latch circuit (62), an RS-422 data converter (63), a clock generator (64), a synchronizing signal generator (65) and a control signal generator (66).

Referring to FIG. 7, a conventional single-scan receiver board (70) receives the control signal, R/G data and G/B data from the single-scan card (60). The scan receiver board (70) comprises a TTL data converter (71) for converting the digital signal to TTL data, a display memory (74) for storing the RGB signal, an address generator (72) for accessing the control data, a data latch circuit (75), a display signal generator (73) for addressing and clocking the data, a serial signal converter (76) for converting the data to a serial signal, a data converter (77) for converting the serial signal to a parallel signal, and an output buffer (78) for outputting the data to the pixel driver block.

SUMMARY OF THE INVENTION

In order to overcome the aforementioned conventional limitation, a new technology is developed to intensify the resolution rate per pixel unit.

An objective of the present invention is to provide an electric displaying device for utilizing a multi-scanning control process comprising the following components: a plurality of pixel units arranged with a set of Light Emitting Diodes (LEDs), basic LED panels and LED modules. Each of the pixel units (P11, P12, . . . ) consists of four LEDs with three primary colors (green G11, red R11, blue B11 and green G'11), a series of pixel drivers (1201, 1021', 1201", 1021'", 1201a . . . ) for controlling each corresponding LED of the pixel units (P11, P12, . . . ), and a series of driver controllers (1202, 1202a . . . ) for controlling each corresponding pixel driver (1201, 1021', 1201", 1021'", 1201a . . . ). Each LED is separately and independently connected to a corresponding pixel driver and is controlled by a corresponding driver controller, a series of pixel-driving cells (915a, 915b, . . . ) fabricated from a series of pixel drivers (1201, 1021', 1201", 1021'", 1201a . . . ) and driver controllers (1202, 1202a . . . ), a series of pixel-driving blocks (915, 915', 915", . . . ) fabricated from a series of pixel driving cells (915a, 915b, . . . ), a series of receiving boards (914, 914', . . . ) for accessing RGB image data and control signals to corresponding pixel-driving blocks (915, 915', 915", . . . ).

The RGB image data and control signal are combined with two phases, phase0 and phase1 with four phase stages, Phase-A, Phase-B, Phase-C and Phase-D to generate four different control stages of signals for processing the multi-scanning.

The receiver board (914) comprises an input unit (1101) for receiving addressed image data and control signal, an output unit (1102) for bypassing unmatched addressed image data and control signal to the next receiver board, a buffer unit (1103) for compensating for distortion of addressed image data and control signal, a series of storing units (1104) for temporarily storing the addressed image data and control signal, a FPGA (1105) for sequentially transmitting the addressed image data and control signal to the corresponding pixel driver, and a PLL IC (1106) for generating a constant frequency.

The multi-scan card (913) comprises a TMDS converter (1001) for receiving input image data and control signal, a CPU (1002) for controlling the system, a PLL IC (1003) for generating constant frequency, a FPGA (1004) for splitting the image data and control signal and addressing the corresponding receiver board, a Gamma RAM (1005) for compensating for distortion of image data and control signal and enhancing resolution, and a series of frame memory units (1006, 1007) for storing each image data and control signal per frame.

An objective of the present invention is to provide a control process for performing multi-scanning on an electric displaying device, the process comprising the following steps of: the multi-scan card (913) processes for splitting and distributing the RGB image data and control signal by sections, in row and columns; the receiver board (914) addresses the RGB image data and control signal to corresponding pixel-driving blocks; accessing the addressed RGB image data and control signal to each corresponding pixel unit; accessing two phase signals, phase0 and phase1, with four phase stages, Phase-A, Phase-B, Phase-C and Phase-D for generating the basic image generated by single-scanning and the intensified image data generated by overlapping the neighboring LEDs along entire screen; and the basic image data and intensified image data are combined and alternated by the corresponding image data and control signals through the entire screen.

Furthermore, another objective of the present invention is to provide a screen of excellent quality, with high resolution, brightness and color quality, by utilizing a multi-scanning control process which adopts a static method instead of dynamic method.

BRIEF DESCRIPTION OF THE DRAWINGS

FIG. 3a is a lozenge-shape arrangement of pixel unit including two yellow green LEDs of the conventional single-scanning process.

FIG. 3b is a triangle-shape arrangement of pixel unit including a pure green LED of the conventional single-scanning process.

FIG. 4a is an arrangement of pixel units with two Y/G LEDs for utilizing the multi-scanning process according to the present invention.

FIG. 4b is an arrangement of pixel units with two red LEDs for utilizing the multi-scanning process according to the present invention.

DETAILED DESCRIPTION OF THE PREFERRED EMBODIMENT

Figure 1:
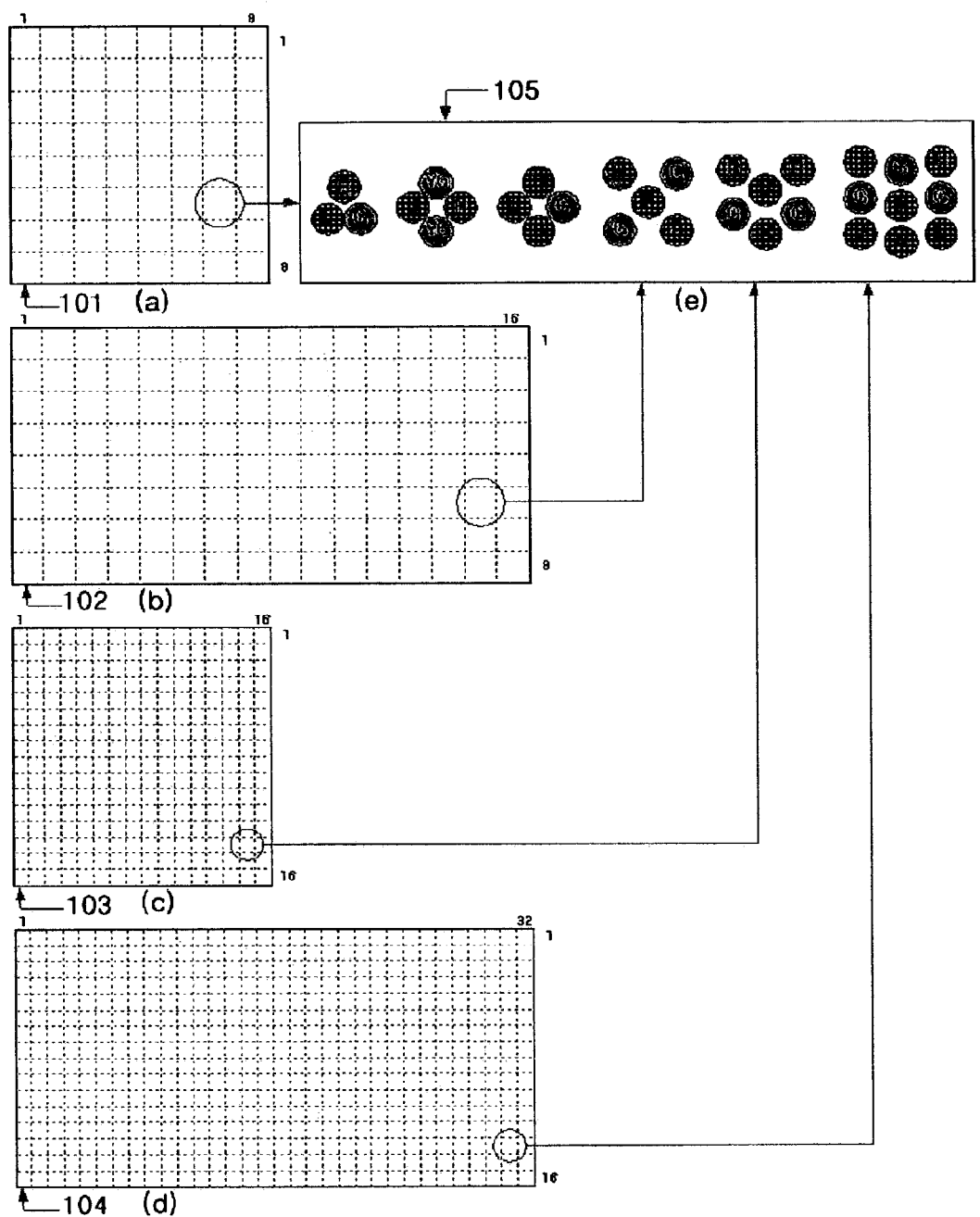
FIG. 1 is a pixel configuration of a conventional LED panel.
Figure 2:
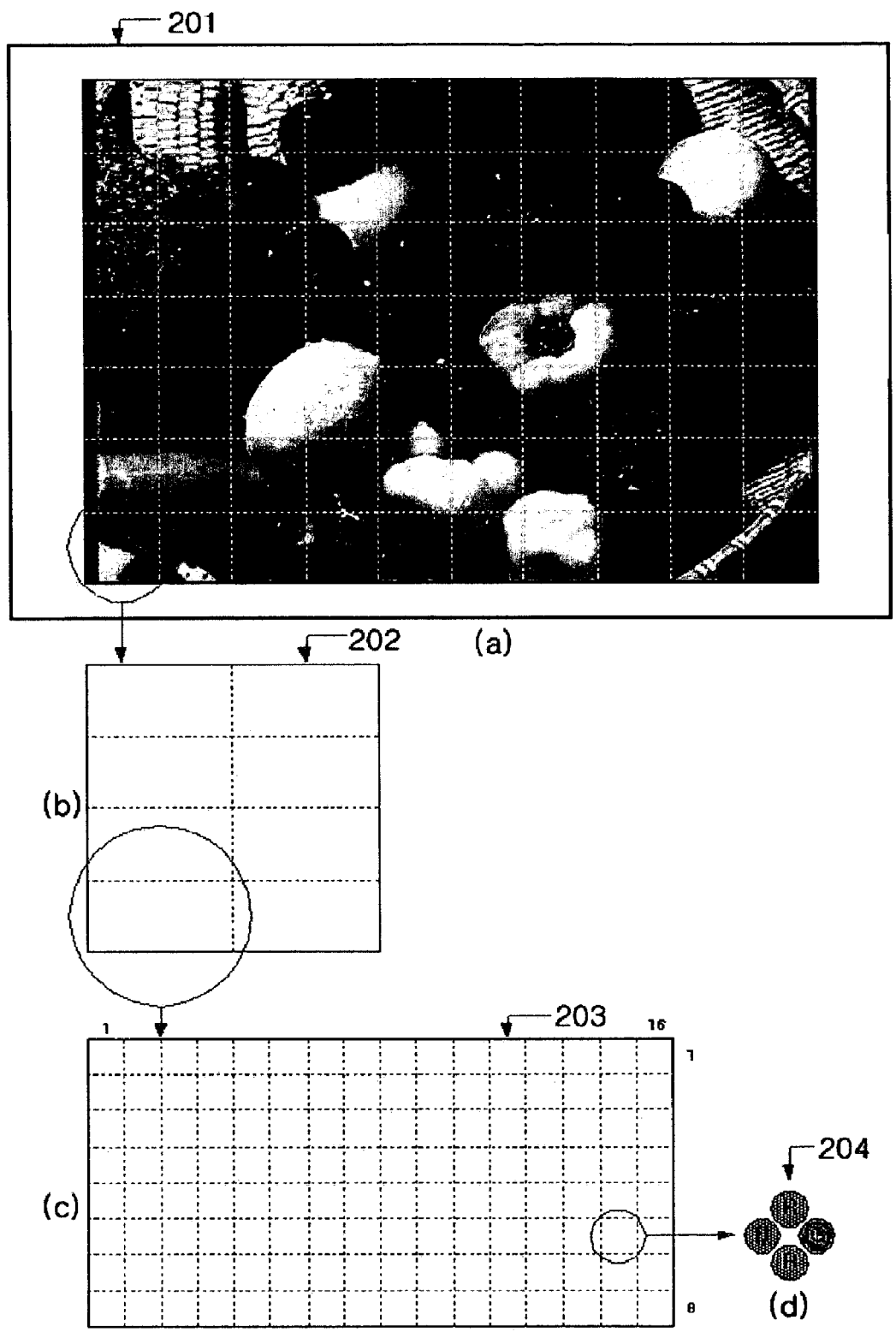
FIG. 2 is a configuration of a conventional LED displaying board.

In order to achieve the objectives of this invention, a new multi-scanning control process is developed. A LED displaying device utilizing the multi-scanning control process comprises a plurality of pixel units, each pixel unit (P11) consisting of more than three LEDs with three primary colors (green G11, red R11, blue B11, and a second green G'11), a series of pixel drivers (1201, 1201', 1201", 1201"', 1201a) for controlling each of the LEDs in the corresponding pixel units (P11, P12, . . . ), a series of driver controllers (1202; 1202a) for controlling the corresponding pixel driver, a multi-scan card (913), and a receiving board (914) for addressing the RGB signal of image data and control signals to the corresponding driver controllers. The control signal for the multi-scanning control process is formed of more than one phase (phase0 or phase1) having a horizontal and vertical synchronizing signal. The RGB signal of the image data composes the intensified image data generated by overlapping the LEDs between the neighboring pixel units with the basic image data generated by single-scanning. The image data generated by multi-scanning process is twice as large horizontally and vertically as that of single-scanning. The image data is stored in a series of memory units of the control PC. Then the stored image data and control signals are accessed to the corresponding pixel driver for responding to the each step of the combined phase signal which has more than two phases of phase0 and phase1 with four stages of Phase-A, Phase-B, Phase-C and Phase-D.

Preferably, the pixel unit consists of four LEDs, each of which is independently controlled even though some of the LEDs have the same color. Furthermore, the phase signal has two kinds of phases, i.e., phase0 and phase1, with four stages.

Since the phase signal contains two kinds, phase0 or phase1, with multiple stages, it is possible to use a phase signal having one kind of phase, either phase or phase0, with two stages.

In this invention, it is possible to use a PC (902) as a remote central controller with a multi-scan card (913) which enables image data to be remotely received and stored from the controlling PC and transmitted to the receiving board (914).

The LED displaying device utilizing the multi-scanning process comprises the following components: a screen assembled with a plurality of pixel units, each of the pixel units consisting of more than three LEDs, with three primary colors and one extra color (G11, R11, B11 and G'11), a series of pixel drivers (1201, 1201', 1201", 1201"', 1201a) which control each LED of the pixel units (P11, P12, . . . ), a series of driver controllers (1202, 1202a) which control the corresponding pixel drivers, a multi-scan card (913) and a receiving board (914) which access the RGB signal of the image data and control signal from the control unit to the driver controller. This LED screen also provides the intensified images along the border lines of the basic LED panels (203) and LED modules (202) in the same manner as overlapping the neighboring LEDs of pixel units.

A process for implementing multi-scanning control comprises the following steps of: capturing the RGB signal of the image data and control signal; splitting and distributing the captured image data and control signal by sections, in row and columns, through a multi-scan card (913); addressing the split RGB image data and control signal to the corresponding pixel-driving blocks through the receiver board (914); accessing the RGB image data and control signal to the corresponding pixel driving units; accessing the RGB image data and control signal sequentially to the basic LED of corresponding pixel unit for generating the basic image by single-scanning; at the same time, accessing the RGB image data and control signal sequentially to the neighboring pixel units for generating the intensified images by responding to each step signal combined two phase signals, phase0 and phase1 with four phase stages, Phase-A, Phase-B, Phase-C and Phase-D, composing and alternating the basic images generated by single-scanning to the intensified images generated by overlapping neighboring LEDs along the entire screen.

Hereinafter, the preferred embodiment of the present invention is described with reference to the accompanying drawings. The core technology of the present invention is to horizontally and vertically overlap neighboring LEDs of pixel units to intensify the resolution rate per pixel unit for the displaying device.

Figure 5A:
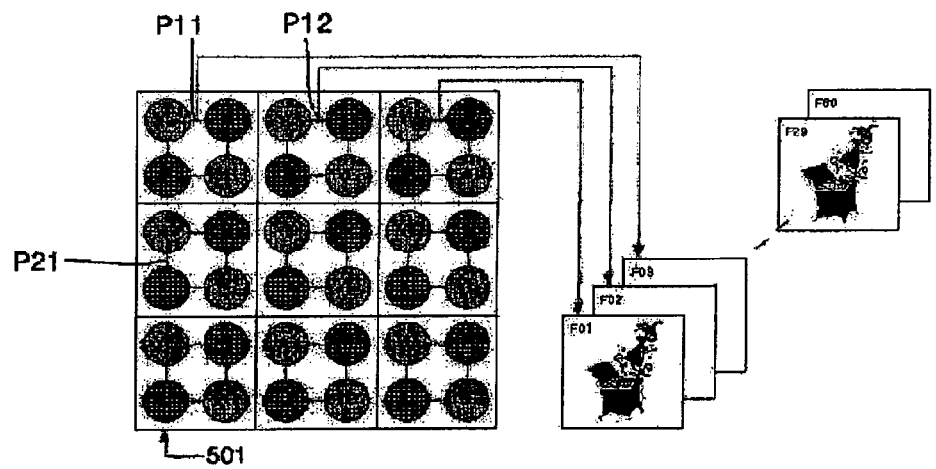
FIG. 5a is the single-scanning process of the conventional process.
Figure 5B:
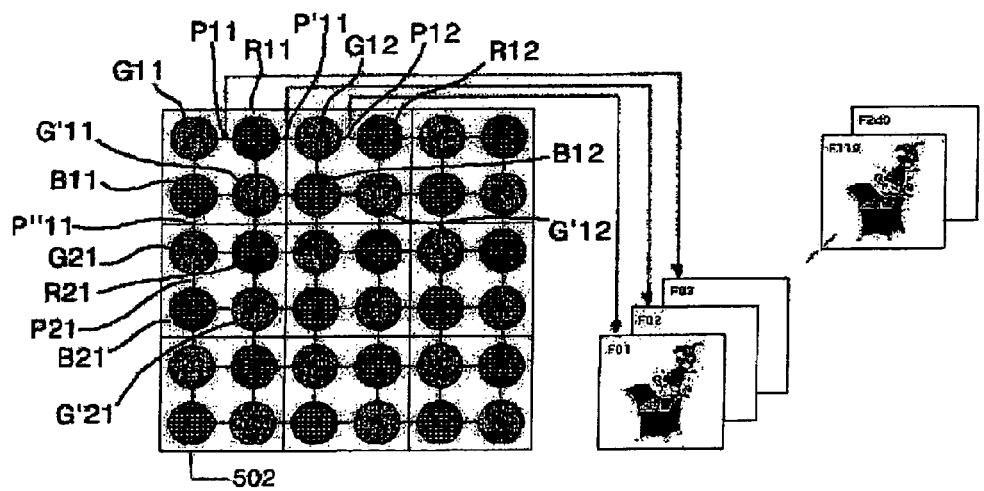
FIG. 5b is the multi-scanning process of the present invention.
Figure 6:
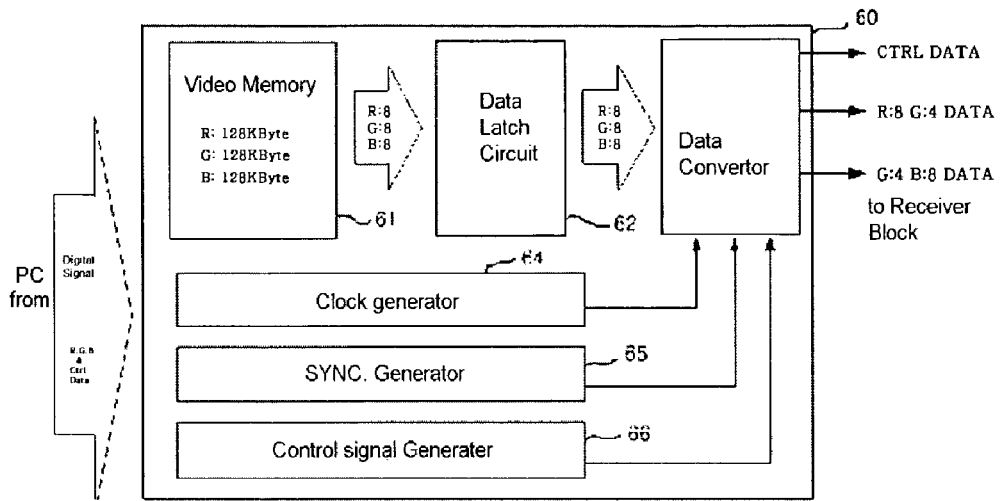
FIG. 6 is a diagram of the single-scan card according to the conventional single-scanning process.
Figure 7:
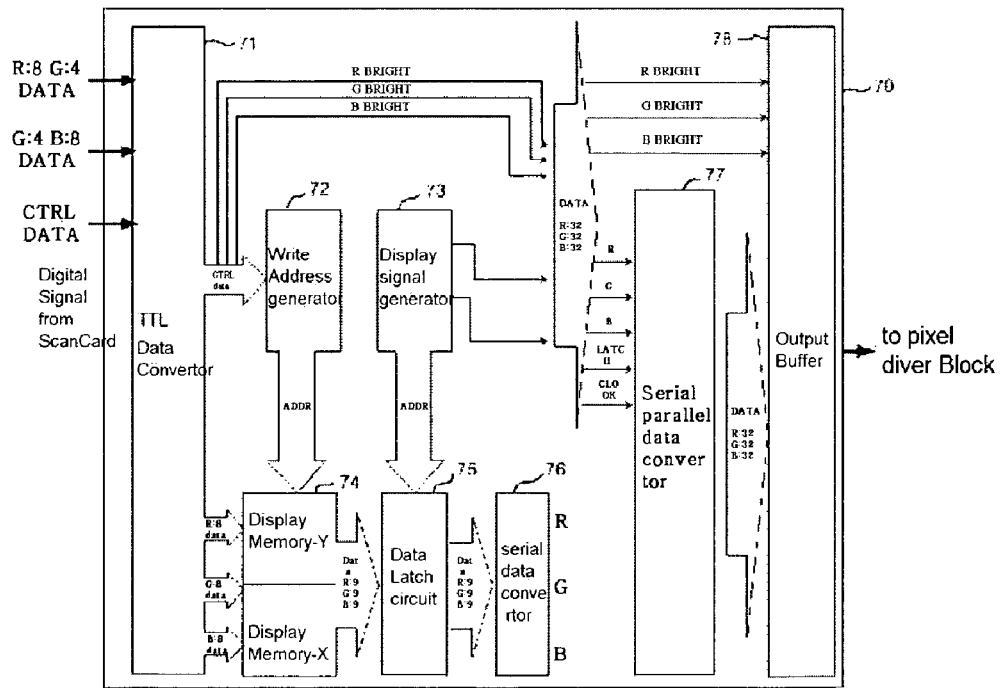
FIG. 7 is a diagram of the receiving board according to the conventional single-scanning process.
Figure 16:
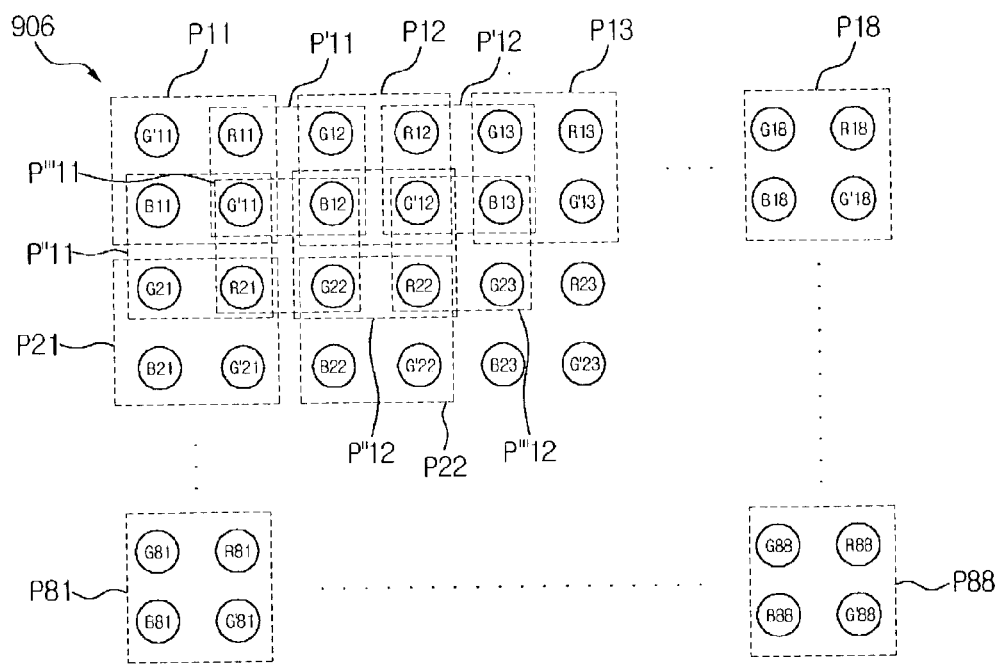
FIG. 16 is a control diagram for overlapping the pixel units arranged on the LED displaying board according to the multi-scanning of the present invention.

A conventional single-scanning process, as shown in FIG. 5a, has a 1:1 resolution rate per pixel unit. The multi-scanning process, as shown in FIGS. 5b and 16, enables an approximate resolution rate of 4:1 per pixel unit because each pixel unit is overlap-scanned through four sides of the neighboring pixel units over the screen.

As seen in the conventional single-scanning process, four LEDs of the first pixel unit (P11) generate a color element, while the next four LEDs of second pixel units (P12, P21 . . . ) are sequentially generating next color elements. However, as seen in FIGS. 5b and 16, the multi-scanning process carries out not only single-scanning the four LEDs (G11, R11, B11 and G'11) of the first pixel unit (P11) to generate a color element, but also overlap-scanning simultaneously and sequentially the overlapped pixel unit (P'11) formed the red (R11) and yellow-green (G'11) of the first pixel unit, and green (G12) and blue (B12) of the second pixel unit (P12) thereby generating an intensified color element before the next four LEDs (G12, R12, B12 and G'12) of the second pixel unit (P12) generate the next color element. In this manner, horizontal resolution increases twice along the row.

In the same manner, four LEDs (G11, R11, B11 and G'11) of the first pixel unit (P11) generate a color element. Before the next four LEDs (G21, R21, B21 and G'21) of the first pixel unit in the second row (P21) generate another color element, the blue (B11) and yellow-green pixel (G'11) of the first pixel unit in the first row, and the green (G21) and red pixel (R12) of the first pixel unit in the second row form an overlapped pixel unit (P"11) to generate another intensified color element, thereby increasing the vertical resolution twice in a column.

As shown in FIGS. 4a, 4b and 5, the most desirable arrangement of the LEDs of pixel units is such that they are easily overlapped around the four sides of neighboring LEDs—upward, downward, leftward and rightward—for utilizing the multi-scanning process. Even if a pixel unit consists two same yellow-greens (Y/G), each of the LEDs must be arranged and connected separately and independently to be controlled.

FIG. 4*a* is an exemplary LED displaying board arranged with blue, red and two yellow-greens (Y/G) colors. FIG. 4*b* is an exemplary LED displaying board arranged with blue, pure green (PG) and two reds (R) colors. Comparing the LED arrangement for multi-scanning control (FIGS. 4*a* and 4*b*) with single-scanning control (FIGS. 3*a* and 3*b*), the LED arrangement for multi-scanning is formed to easily overlap neighboring LEDs between pixel units for improving the resolution rate per pixel unit.

Figure 9:
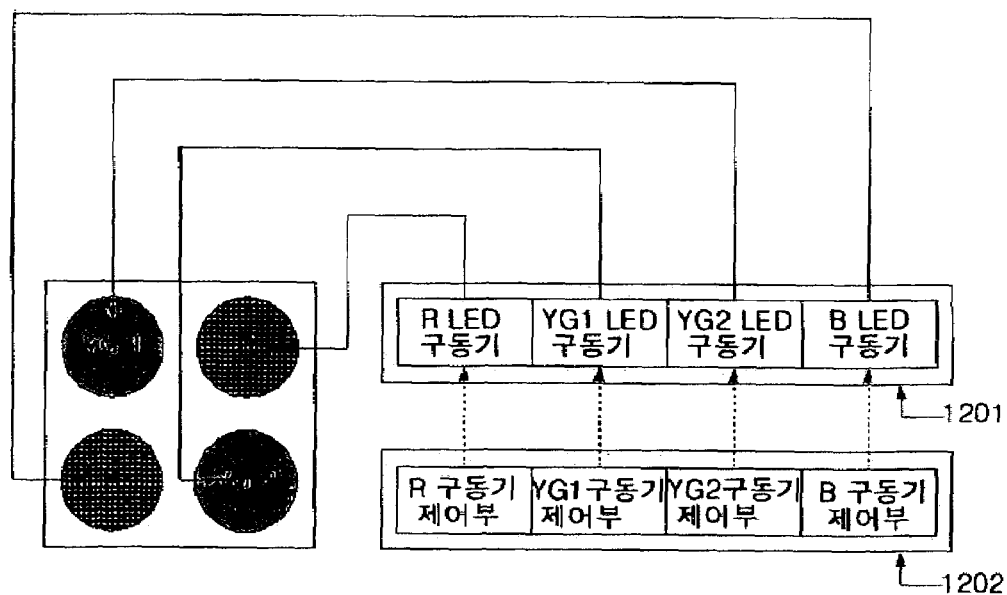
FIG. 9 is a configuration of pixel units and pixel drivers according to the multi-scanning process of the present invention (applied Y/G).
Figure 10:
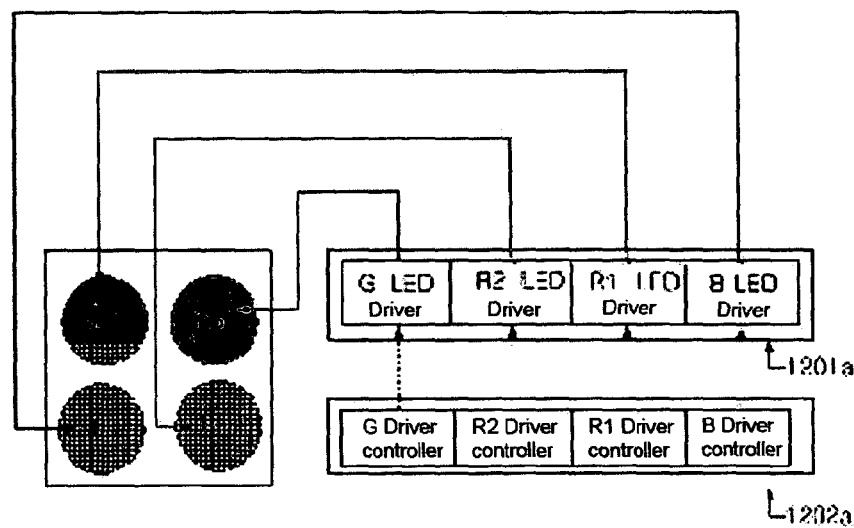
FIG. 10 is a configuration of pixel units and pixel drivers according to the multi-scanning process of the present invention (applied PG).

The arrangement of one pixel unit, as seen in FIGS. 9 and 10, is identical with that of a displaying board as seen in FIGS. 4*a* and 4*b*, respectively. Each of the LEDs is connected to the corresponding pixel driver and the corresponding driver controller. Each of the driver controllers independently controls the corresponding pixel driver and the corresponding LED of pixel units. For example, the first yellow-green (YG1) and second yellow-green (YG2) are separately and independently controlled by the corresponding pixel driving ICs (D1, D4) of the pixel driver (1201) and the corresponding driver controller (1202). In the same manner, the first red (R1) and the second red (R2) are separately and independently controlled by the corresponding pixel driving ICs (D1*a*, D2*a*) of the pixel driver (1201*a*) and the corresponding driver controller (1202*a*).

Figure 8:
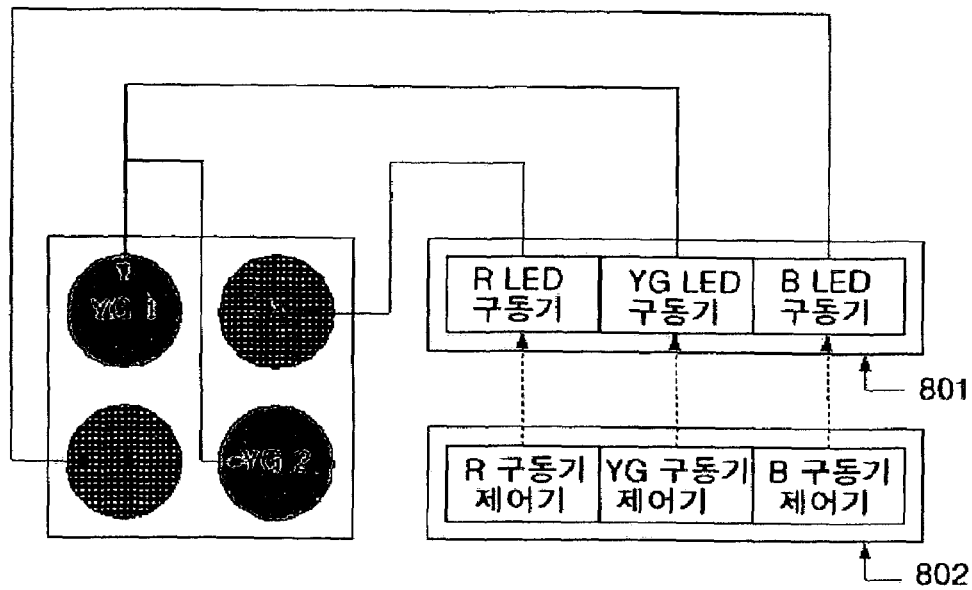
FIG. 8 is a configuration of pixel units and pixel drivers according to the conventional single-scanning process.

As shown in FIG. 8, the conventional single-scanning method has the two yellow-green LEDs (YG1, YG2) connected in parallel to a common Y/G LED pixel driver and controlled by the common Y/G LED driver controller. Contrarily, the multi-scanning method has two yellow-green LEDs (YG1, YG2) independently connected to a separate Y/G LED pixel driver and controlled by the corresponding Y/G LED driver controller, as seen in FIG. 9. The multi-scanning control adopts an overlapping process between neighboring LEDs of pixel units. The two Y/G LEDs should be distinguished into YG1 and YG2 to receive the image data and signals at 60 frames/sec and controlled by each driver. This process could be applied in the same manner if the Y/G is replaced by PG, as seen in FIG. 10.

Figure 12:
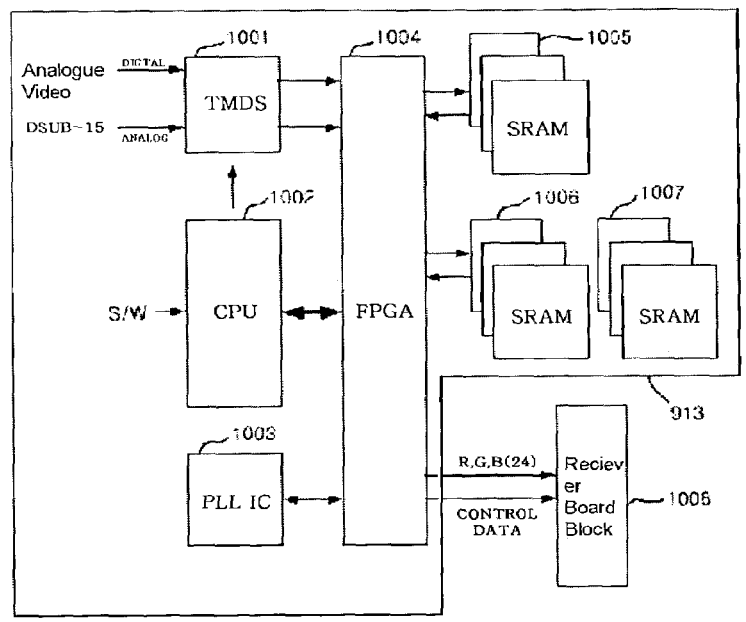
FIG. 12 is a block diagram illustrating the signal process of the multi-scanning card according to the present invention.
Figure 13:
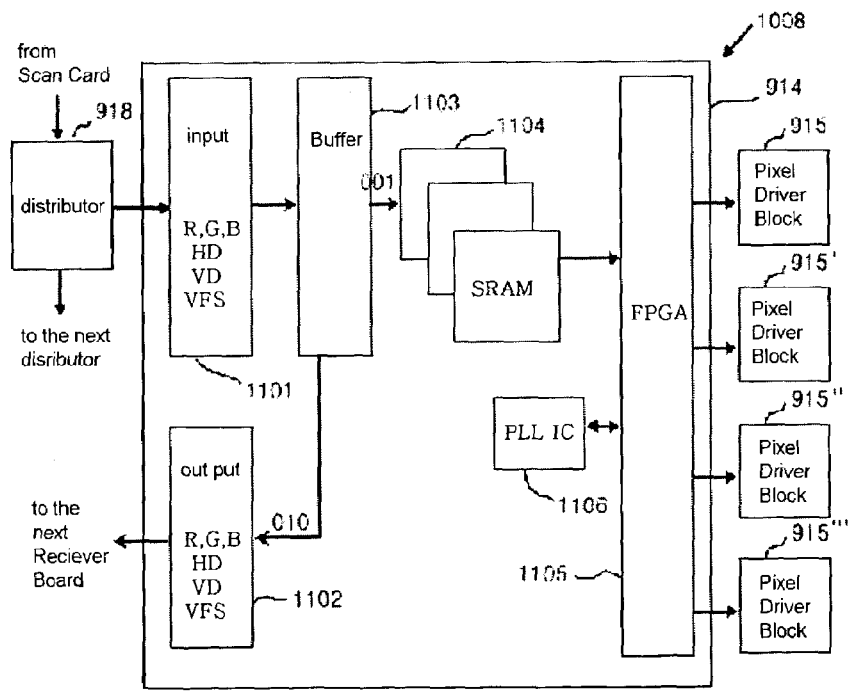
FIG. 13 is a block diagram illustrating the signal process of the receiving board according to the multi-scanning of the present invention.

Furthermore, the transmitting speed of the image data and signal from the receiving board for controlling the driving board is 240 fps, which is four times faster than the conventional processing speed of 60 fps. The multi-scanning process adopts 60 frames of image data, which is twice as large horizontally and vertically than that of conventional image data. As shown in FIGS. 12 and 13, the multi-scanning process provides a series of memory units for storing the image data and signal. The stored image data and signal are transformed to a signal with ⅙₀s of four phases and transmitted at each phase for displaying the corresponding image data on the displaying device. Because the receiver board adopts the faster data processing speed for controlling the RGB LEDs, it is easily recognized by naked eye that color quality and brightness are remarkably improved. The frequency of the image data and signals applied to multi-scanning is four times higher than that of conventional single-scanning, so that resolution is also remarkably improved.

Referring to FIGS. 11*a* to 17, an embodiment of the control board for implementing the multi-scanning process of this invention is explained in detail.

Figure 11A:
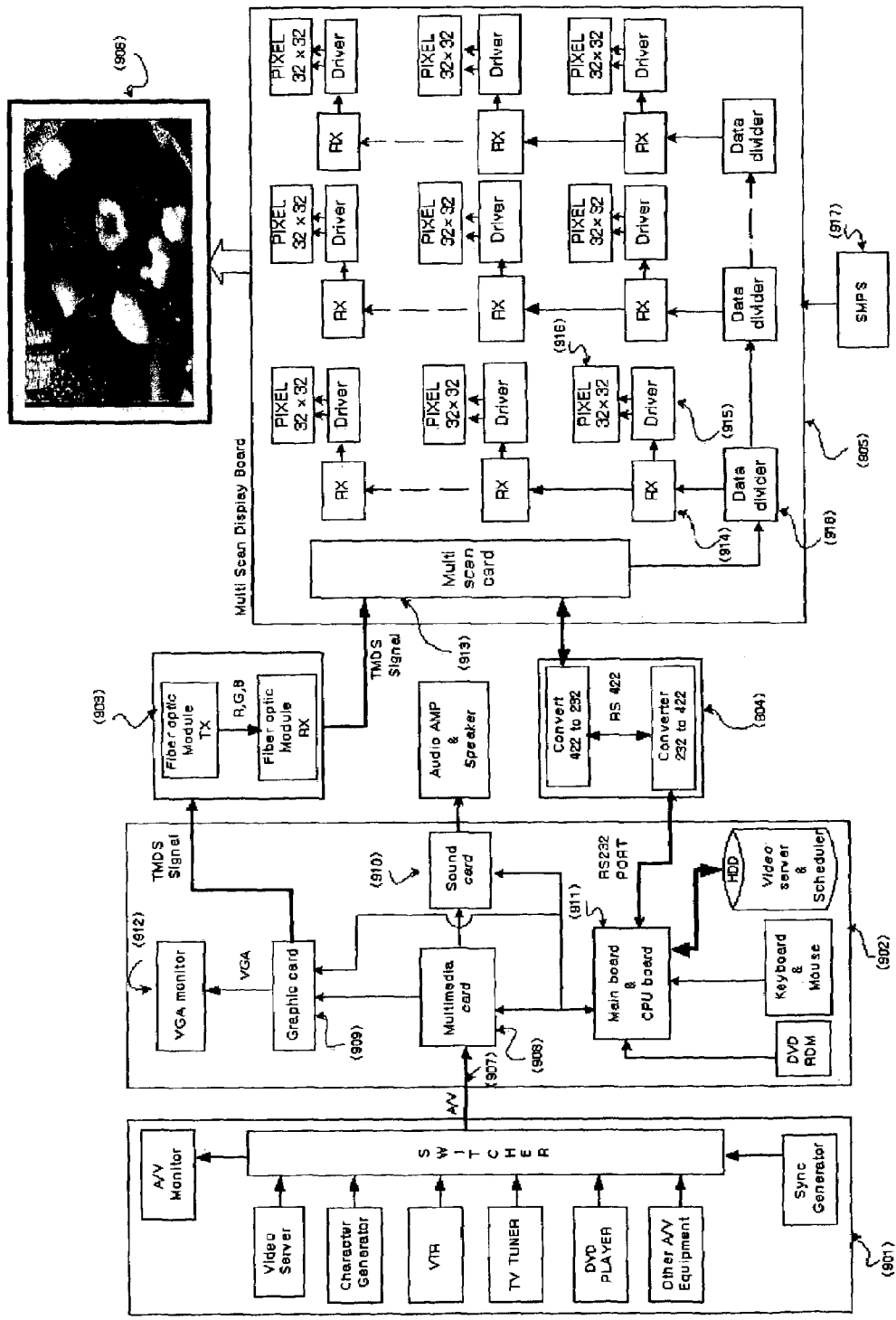
FIG. 11a is an overall configuration of the displaying board system according to the multi-scanning process of the present invention.

As seen in FIG. 11*a*, an output means (901) transmits an audio/video (A/V) multimedia signal to a control PC (902) equipped with a CPU and storing units through an A/V signal input cable (907). The output means (901) is a source of A/V multimedia signal, such as a video sever, character generator, VTR, TV turner, DVD player or other A/V equipment, etc. The A/V multimedia signal is a form of stored signal, transformed video signal received in various forms, a self-generated video signal or a regenerated A/V signal from a recording media (LD, VCD, DVD, etc.). Once the PC receives the A/V signals, a multimedia card (908) transforms the captured A/V signals to a graphic signal and video data. The video signal is transmitted to a graphic card (909) for converting to VGA and a TMDS digital signal. The video signal containing the RGB information is transmitted to a multi-scanning display board (905) via a TMDS (Transition Minimized Differential Signal), a digital signal transmitting optical module (Tx & Rx) and an optical cable (903). At this point, it is desirable to display the converted video signal on a VGA monitor (912) to visually check the operating status of the PC and the control program of the LED display board. The audio signal is also inputted to the multimedia card (908) and transmitted to a sound card (910) for outputting the sound through an audio amplifier and a speaker. The control signals are transmitted to the display board (905) of the multi-scanning process via an RS 232 port, along the main board and CPU board (911) of the control PC (902), and via an RS422 port between the control data converters in a cable (904).

Hereinafter, a display board (905) for the multi-scanning control process—a core technology of this invention—will be described in detail. The RGB signal and control signal are transmitted to a multi-scan card (913) in the display board (905). A data divider (918) divides the transmitted signals by sections, in rows and columns. The divided signals are transmitted to a series of receiver boards (914, . . . ). Then, the divided signals are stored to the corresponding receiver board (914), along with the corresponding sections, in rows and columns. When a certain amount of divided signals is fully stored in the first receiver board, the rest of the divided signals are bypassed to the next available receiver board (914') along the series of corresponding sections, in rows and columns.

The image data transmitted to the receiver board (914), as well as the corresponding image data addressed to the corresponding receiver board, is transmitted to the corresponding pixel driving block (915) for operating the pixel receiver (1201) to display the video data on a LED displaying panel (916). If the image data is not addressed to the corresponding pixel driver, it will be bypassed to the next corresponding pixel driver. A power source (917) supplies the electric power to an LED display board (906) for displaying the image data.

Figure 11B:
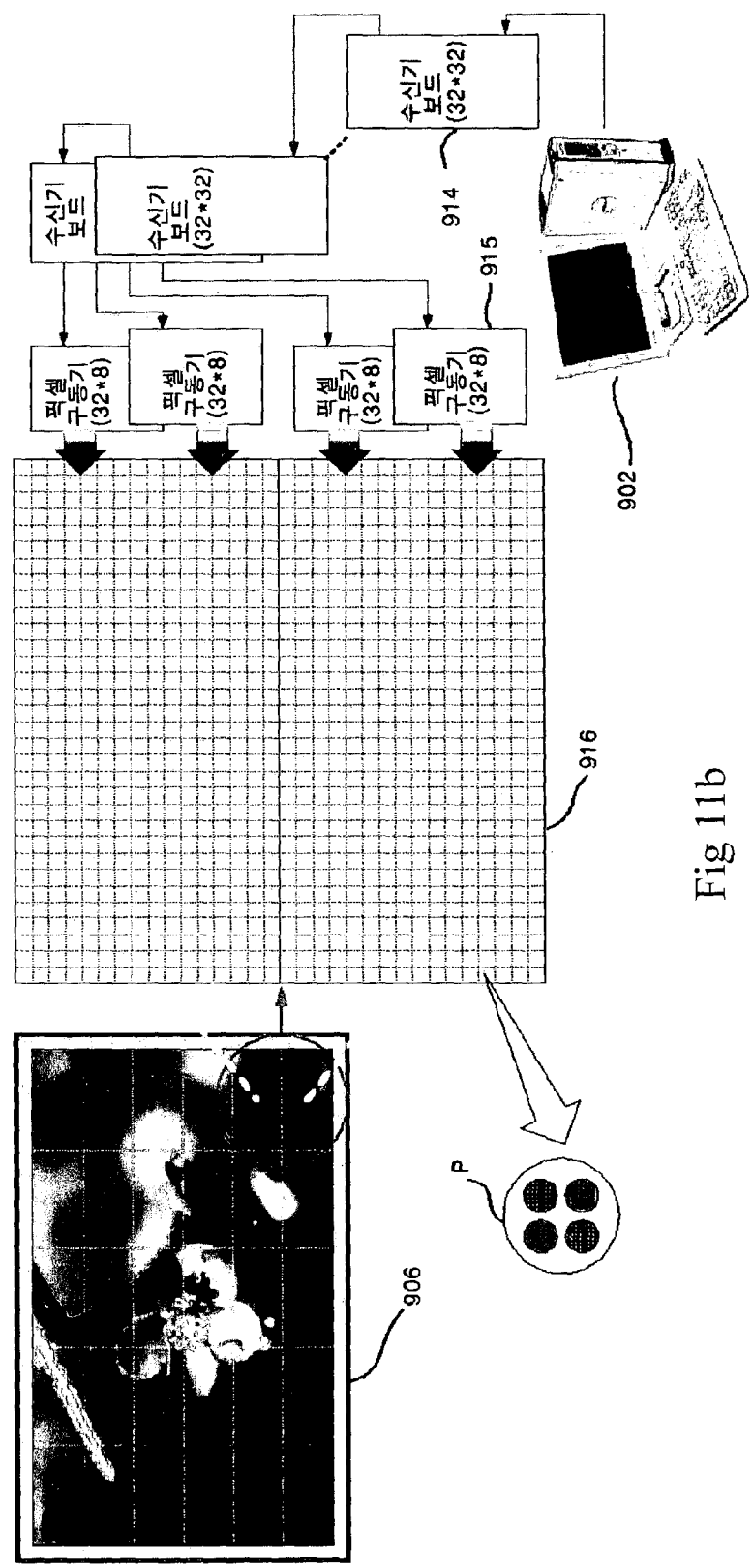
FIG. 11b is a control flow diagram of the displaying board system according to the multi-scanning process of the present invention.
Figure 11C:
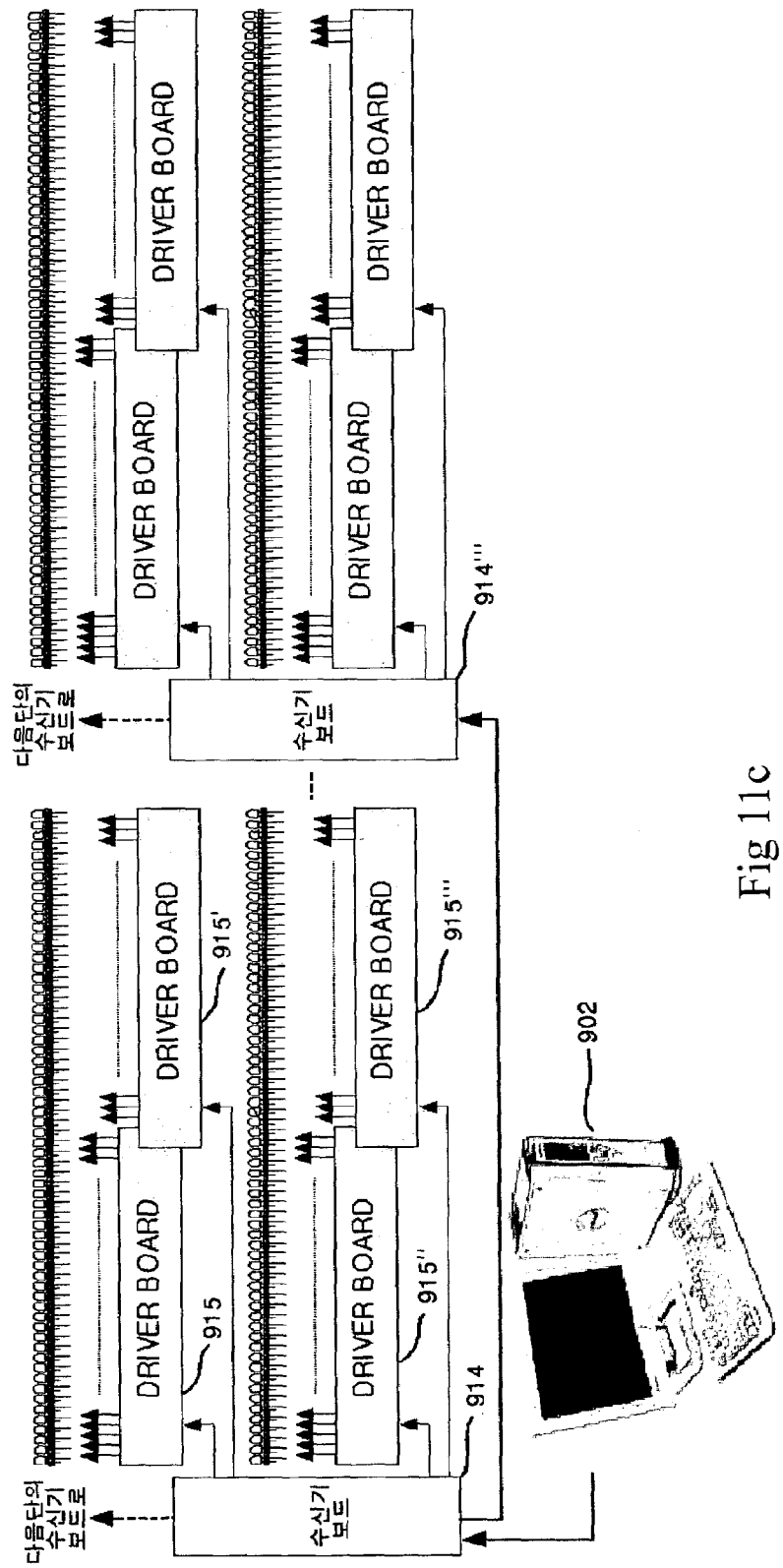
FIG. 11c is an operating system diagram of the receiving board and pixel driver unit according to the multi-scanning process of the present invention.

Referring to FIGS. 11*b* and 11*c*, a receiver board (914) receives the RGB image data and control signal from a main control PC (902). The image data and control signals are transmitted to the pixel-driving block (915) for processing each LED of the basic LED panels (916). Thus, the desired image can be displayed on the displaying panel (906). At this point, each receiver board (914) enables control of 32×32 LED panels through four pixel driving blocks (915). Each basic LED panel (916) is 32×8 and is driven by two pixel driving blocks (915).

Referring to FIGS. 11*a* and 12, the operation of the multi-scan card (913) is described in detail. First, the analogue video signals and digital control signals received from the control PC are converted to a Transition Minimized Differential Signal (TMDS) by a TMDS converter (1001). The converted TMDS is accessed by a Field Programmable Gate Array (FPGA) (1004). The FPGA, a programmable gate array, splits the TMDS image data containing the RGB signals and control signals according to each receiver address, and distributes the split TMDS image data to each address of the corresponding receiver (1008). The multi-scan card (913) comprises a TMDS converter (1001), a CPU (1002) for controlling the overall system through communication with the controlling PC, a PLL IC (1003) for generating consistent frequencies, a FPGA (1004), a Gamma RAM (1005) for compensating for the distortion which occurs during display and enhancing the resolution, and a series of frame memory units (1006) for storing each image data signal per frame. Then, each RGB data and control signal is transmitted to a receiver board block (1008).

In the multi-scan board (913), there are two types of analogue and digital transmitting methods for inputting signals from TMDS (1001) to FPGA (1004). With the digital method, the received TMDS signal (1001) is transmitted with 8 bits of each RGB signal and control signal of HBLK, VBLK, VFS, DE to FPGA (1004). With the analogue method, the received input signal is used to adjust the contrast and brightness by adjusting the RGB gain, i.e., the i2c communication controlled by the CPU. This system enables the selective receipt of either analogue or digital signals to transmit a main digital processor signal.

Next, the control PC (902) communicates with the CPU (1002) through the transmitting method of the RS 232(RS 422) for controlling the entire system. In order to compensate for the distortion which is occurred during a displaying and to enhance the resolution, the following adjustments are performed as follows: the control units of the RGB Gamma Ram and frame memory are turned on or off; the SW_H and SW_V, horizontal vertical location, are adjusted for setting on the users' desired place; blocking memory is adjusted for controlling minute differences of display due to external factors such as voltage and current. RGB multi-adjustment is carried out for adjusting the values used in multi-blocking.

Between the CPU (1002) and the FPGA (1004), the FPGA processes the signals received from the TMDS converter (1001) to store in a series of gamma memory units (1005) and frame memory units (1006, 1007). The FPGA processes the amount of data needed for displaying to synchronize the H_size and V_size data with the HBLK phase0 and phase1 RGB data.

Between the PLL IC (1003) and the FPGA (1004), there are several types of image signals—VGA (25 Mhz), SGA (40 Mhz) and XGA (65 Mhz)—generated by the control PC. The PLL IC (1003) is controllable by the CPU (1002) and outputs constant signals regardless of the inputted frequency. It is also possible to design 16 Mhz for displaying the signal data, but the frequency is tolerable.

A series of frame memory units (1006) enable frame delay as well as the alternating of the output of reading and writing for displaying data on the users' desired place through a switching process of the sw_h and sw_v, and outputting the data with the frequency generated by the PLL.

A series of the gamma memory units (1005) stores the data for compensating for the distortion occurred during a display and representing the various levels of brightness based on the value of CDs and data to maximize the resolution by mapping the actual data over the file generated according to the LED character and white balance.

Now, referring to FIGS. 11a and 13, the operation of the receiver board (914) is described in detail. First, the image signals containing the RGB data and HD, VD and VFS control signals are transmitted to an input unit (1101) from a divider (918), and temporarily stored in a buffer unit (1103). When the address of stored data in the buffer unit (1103) matches the address of received data from the receiver module, data is stored in a series of SRAM (1104) for sequentially transmitting the image data to the FPGA (1105). Then, the FPGA (1105) sequentially transmits the image data stored in SRAM (1104) to the corresponding pixel driver units (915, 915', 915", 915''') for displaying the image.

If the address of the stored data in the buffer unit (1103) does not match the address of the received data from the receiver module, the data is bypassed through an output unit (1102) to the next receiver board block. For example, when the current address of the receiver board is "001" and the destination address of received image data is "001", the data will be stored at the current receiver board of the SRAM (1104). If the destination address of the received image data is '010', the data will be bypassed through the output unit (1102) to the next receiver board block. A PLL IC (1106) is for generating consistent frequencies. The FPGA (1105) may be replaced by a CPLD.

The data flow in the control device is the same as the bus direction represented in the block diagram. As a sequential description, the analogue or digital data received at the TMDS (1001) is transformed to appropriate image data suitable for displaying through the Gamma memory units (1005). Then, the image data is inputted to a series of two frame memory units (1006, 1007). At this point, the image data is transformed to an alternative manner of reading or writing. That is, the series of memory units has two alternating functions of reading and writing, so that one side of the memory units is activated for writing, while the other side of memory units is activated for reading. Either side of the memory units enables the alternating of the performance order of reading or writing. Beyond this point, the frequency regulated by the PLL IC binds the image data and control signals for transmitting to a receiver board block (1008). At the same time, a CPU (1002) interfaces between the FPGA unit (1004) and communicates with the controlling PC to satisfy the user's demand inputted through the GUI. A receiver board block (1008) processes the RGB data and control data received from a scan-card and transmits to the displaying module. A buffer (1103) compensates for signal distortion of each RGB during the transmitting process. Then, the image data is outputted to a LED display board for displaying the desired images and media according to the regulated transmitting method.

Figure 17:
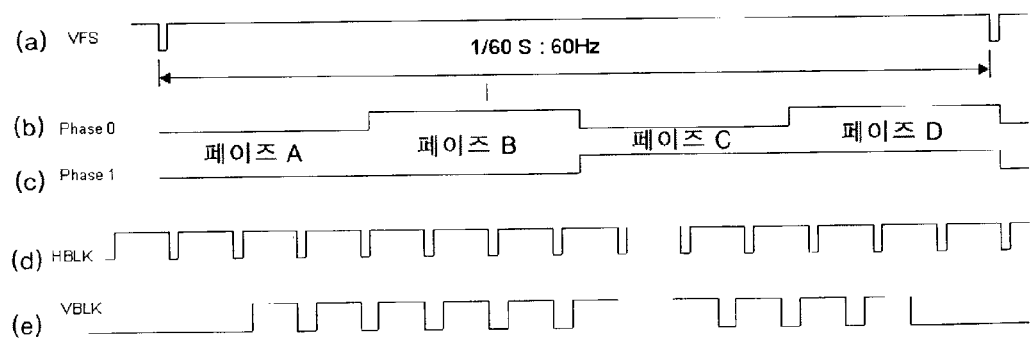
FIG. 17 is a timing diagram of control signals transmitted to the receiving board from the multi-scanning card of the present invention.

With reference to FIG. 17, various control signals for the image data are disclosed. As seen in FIG. 17a, VFS represents a frame signal of 60 hz that appears in every frame. The phase signals, phase0 and phase1, are uniquely applied to the multi-scanning process of this invention, with four stages, Phase A, Phase B, Phase C and Phase D, for controlling the R-G-G-B LEDs. VBLK represents a video blank signal indicating an actual data location. The HBLK signal is used for analogue, which has a wider timeframe than VBLK to provide pre-heating time in the CRT method.

Figure 14:
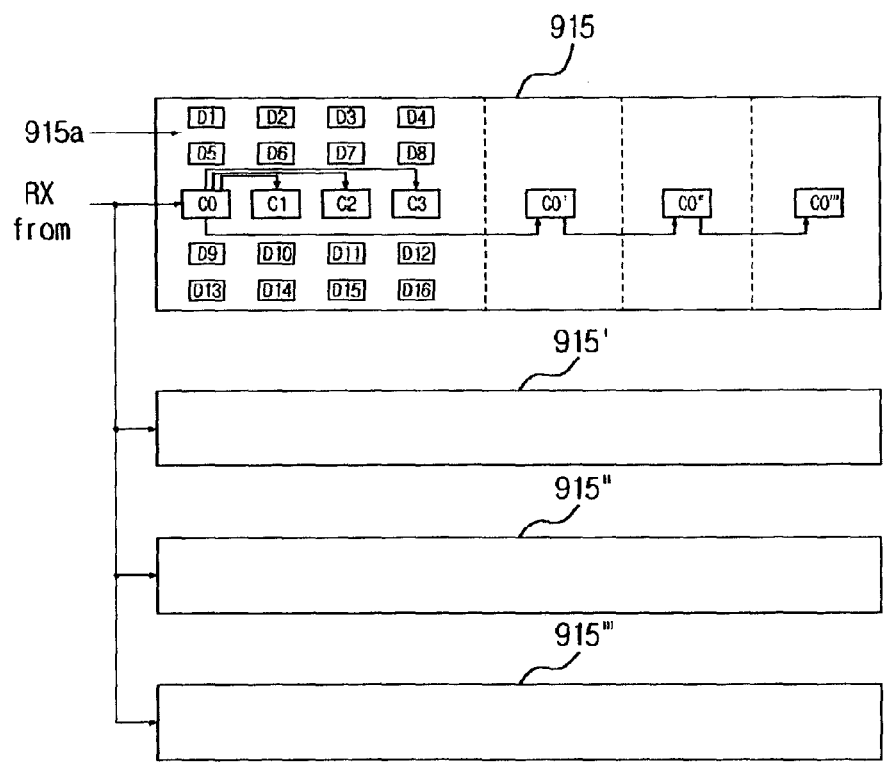
FIG. 14 is a configuration of pixel-driving units according to the multi-scanning of the present invention.
Figure 15:
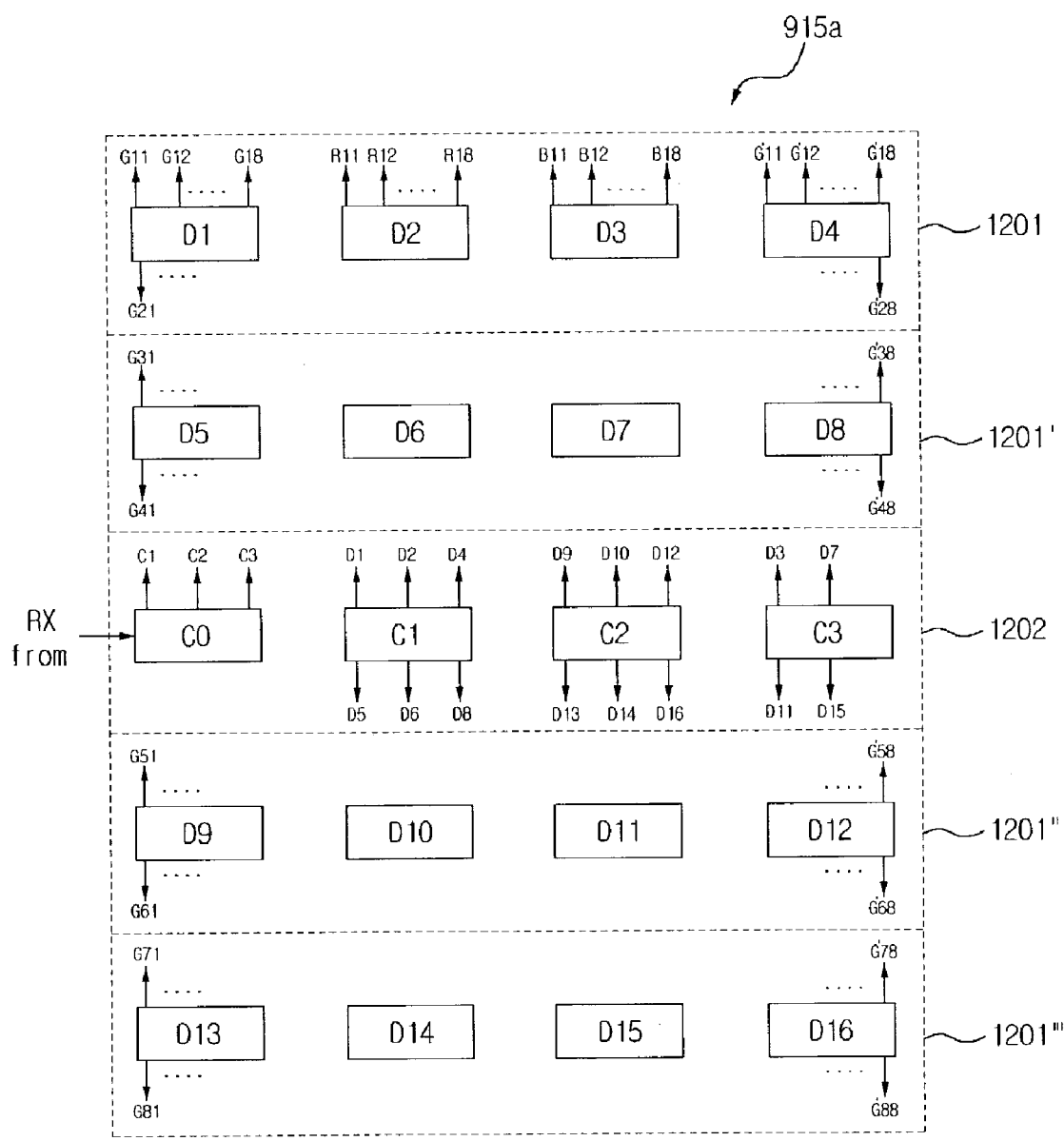
FIG. 15 is an enlarged block diagram illustrating a configuration of each pixel-driving cell according to the multi-scanning of the present invention.

Referring to FIGS. 14 through 16, a practical configuration of a control board related to the LEDs is described. As seen in FIG. 14, one receiver board (914) is connected to four pixel-driving blocks (915, 915', 915", 915'''). Each pixel driving units forms four pixel-driving cells (915a) to drive 32×8 pixels. Further, each pixel-driving cell forms four pixel drivers (1201, 1201', 1201", 1201''') to drive 8×8 pixels and a driver controller (1202). Each pixel driver has four pixel-driving ICs (or chips). Thus, one pixel-driving cell (915a) consists of 16 pixel-driving ICs (D1-D16). The driver controller (1202) includes three driver control ICs (C1-C3) for controlling the pixel-driving ICs, and a control IC (C0) for enabling the driver control IC. Therefore, one receiver block can drive the 32×32 pixels.

As seen in FIG. 15, an enlarged diagram of a pixel-driving cell (915a) illustrates the first to fourth pixel-driving ICs (D1-D4) for driving 8×2 pixels (P11-P18, P21-P28). In detail, the first pixel-driving IC (D1) drives the first yellow-green LEDs (G11-G18, G21-G28) of each pixel, the second pixel-driving IC (D2) drives the red LEDs (R11-R18, R21-R28) of each pixel, the third pixel-driving IC (D3) drives the blue LEDs (B11-B8, B21-B28) of each pixel, and the fourth pixel-driving IC (D4) drives the second yellow-green LEDs (G'11-G'18, G'21-G'28) of each pixel.

The first, second and fourth pixel-driving ICs (D1, D2, D4) are processed when the first driver control IC (C1) accesses the clock. The third pixel-driving IC (D3) is processed when the third driver control IC (C3) accesses the clock. The control signal and image data received from the receiver board (914) enable the control IC (C0). Sequentially, the control IC (C0) enables the driver control ICs (C1-C3). Next, the driver control ICs (C1-C3) enable the corresponding pixel-driving ICs (D1-D4).

Referring to FIGS. 16 and 17, a process of multi-scanning control is described how it is carried out through the configuration of each pixel unit on the displaying board. A phase signal for processing the multi-scanning is generated by combining the Phase signal, phase1 and phase1 at four stages of Phase-A, Phase-B, Phase-C and Phase-D.

At Phase A, phase0=0, phase1=0, a set of basic pixels (Pij) at row i and column j is addressed by four LEDs, Gij, Rij, Bij and G'ij and captured by a pixel driver to display a single-scanned image on the screen.

At Phase B, phase0=1, phase1=0, a set of neighboring pixels (P'ij) at row i and column j which are neighbored between columns in each row has four LEDs, Gi,j+1, j, Ri+1, j, Bi, j and G'ij.

At Phase C, phase0=0, phase1=1, a set of neighboring pixels (P'''ij) at row i and column j which are neighbored between the rows in each column has four LEDs, Gi+1, j+1, Ri+1, j, Bi, j 1 and G'ij.

At Phase D, phase0=1, phase1=1, a set of neighboring pixels (P'''ij) at row i and column j which are neighbored between the rows and columns has four LEDs, Gi+1, j+1, Ri+1, j, Bi, j+1 and G'ij.

Each stepped phase signal is overlapped and captured the corresponding LED of pixel units by the pixel driver to display the multi-scanned intensify image on the screen.

Because the multi-scanning process enables more than two phases per frame, it is possible to increase resolution by two times.

For example, an overlap-scanning process having two phases, Phase A and Phase B, enables horizontal resolution to be improved by two times. In the same manner, the overlap-scanning process having two phases, Phase A and Phase C, enables vertical resolution to be improved by two times. Therefore, the multi-scanning process having four phases, Phase A through Phase D, enables both horizontal and vertical resolution to be improved thereby improving overall resolution by four times.

Figure 18:
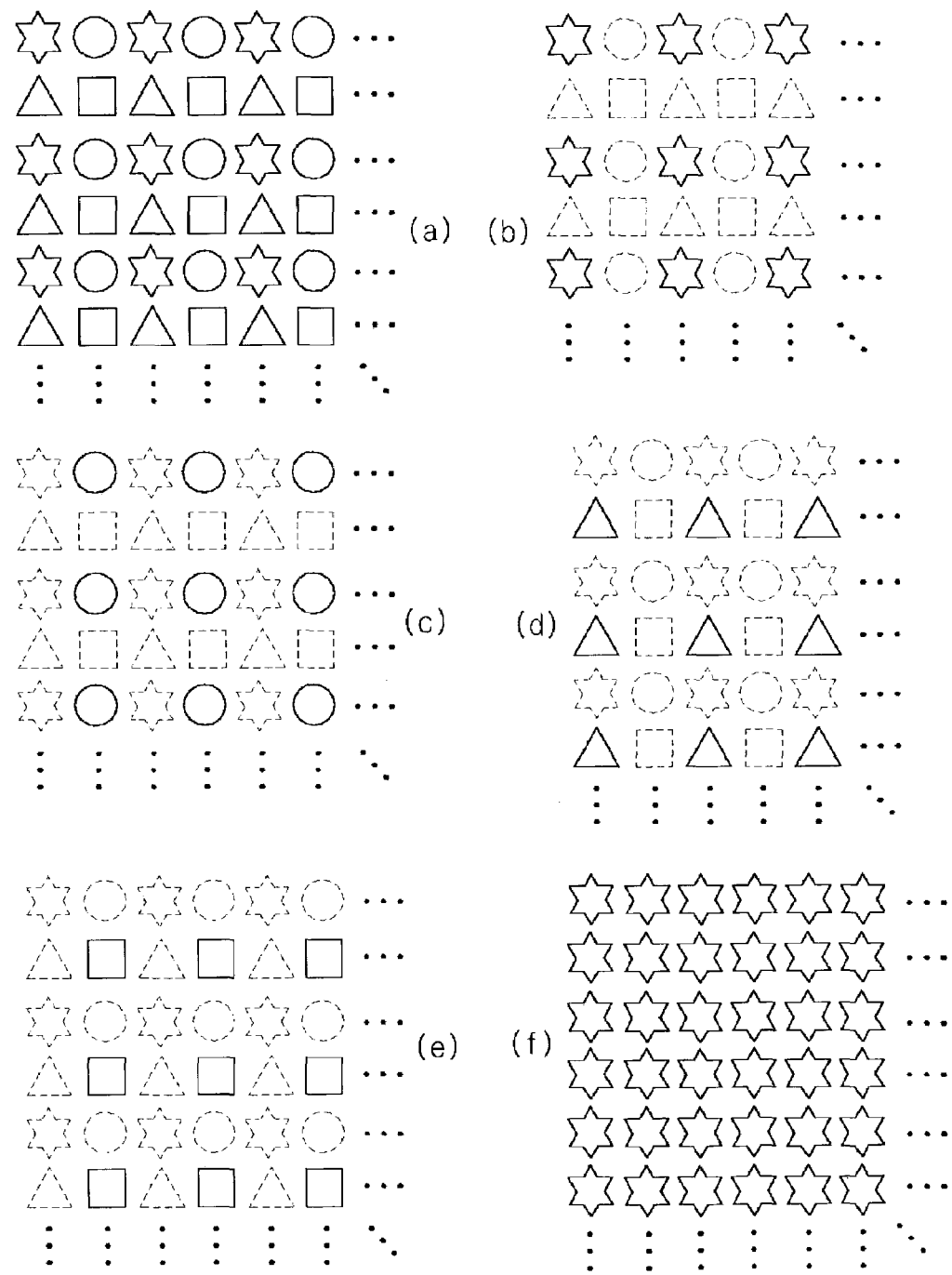
FIG. 18 is a set of mosaic diagrams illustrating the process of capturing and storing the image data of the multi-scanning process of the present invention.

As shown in FIG. 18, a pictorial explanation is disclosed how the image data of the multi-scanning control process is captured and stored. Since the display memory unit (74) of the conventional single-scanning process stores the image data in a single form as seen in FIG. 18f, the image data is outputted with a transmitting speed of 60 fps through a receiver board for accessing the image data to a pixel driver and displaying on the screen.

However, the image data of the multi-scanning process, as seen in FIG. 18a, is stored in the SRAM (1104) of the receiver board, with a density of 2×2.

Referring to FIGS. 17 and 18b, at Phase A, phase0=0, phase1=0, the basic pixels in the first row (P11, P12, ... P18, P21, ... P88) are captured by a pixel driver and display the single-scanned image on the screen. Then, at Phase B, phase0=1, phase1=0, as seen in FIG. 18c, the pixels between the columns in the first row (P'11, P'12, ... P'18, P'21, ... P'88) are overlapped and captured by the pixel driver to display the double image on the screen. At Phase C, phase0=0, phase1=1, as seen in FIG. 18d, the pixels between the first and second rows (P''11, P''12, ... P''18, P''21, ... P''88) are overlapped and captured by the pixel driver and display the triple image on the screen. At Phase D, phase0=1, phase1=1, as seen in FIG. 18e, the pixels between columns in the first and second rows and columns (P'''11, P'''12, ... P'''18, P'''21, ... P'''88) are overlapped and captured by the pixel driver to display the multi-scanned intensify image on the screen. It is desirable to process the overlapped images at a speed of 240 fps, or four times faster than the single-scanning process speed.

Although one typical pixel driver is cited for describing the multi-scanning process in the example, the rest of the pixel drivers are operated in the same manner. Neighboring pixels disposed at the boundary of the basic LED panels and the LED modules are also overlap-scanned by shifting through the corresponding pixel drivers.

As discussed above, the multi-scanning process adopts four phase signals for controlling the image data. It is also possible to adopt two phase signals for implementing a double-scanning process. It is desirable for the double-scanning process to use a scanning speed of 120 fps.

Further, the basic pixel unit for the double-scanning process can be configured with three LEDs. In this situation, the pixels are arranged with one LED of the first pixel and two neighboring LEDs of the second pixel for duplicating operation. Thus, it is possible to double the resolution by adopting a phase signal with two phases, Phase A and Phase B, to generate a basic pixel image and a duplicated pixel image.

As discussed above, it is possible to increase two or more times of the resolution per screen size by applying the technology of this invention. Thus, the intensified screen of the present invention is suitable for indoor placement, e.g., at a supermarket or mart. Furthermore, the screen utilizing the multi-scanning process can replace the expensive PDP because it has the advantages of intensified brightness and resolution per unit pixel, as well as compactness of size and economy of cost.

In particular, since the present invention includes a multi-scan display board (905) that multi-scans RGB data based on TMDS digital signals and control signals inputted from the PC (902) and outputted to multiple pixels, a multi-scan card on a display board and a control program on a PC (902) can convert and control the video signals inputted from A/V output means (901) to display various streaming videos on an LED screen in real time.

The core technology of this invention enables the overlapping of neighboring LED pixel units around four sides—upward, downward, leftward and rightward—to increase the resolution rate per unit size without affecting brightness. For example, when a screen has the resolution of 320×224 at 12.5 mm pitch, the size of the screen should be 4,000 mm (W)×2,800 mm (H). When the multi-scanning process of this invention is applied, the resolution of a screen is increased by two times, to 640×448, while the size of screen remains the same, 4,000 mm (W)×2,800 mm (H). That is, it has the same effect as reducing the pitch of pixel unit by half, from 12.5 mm to 6.25 mm, for obtaining clearer resolution with high quality of color.

While the present invention has been described in detail with its preferred embodiments, it should be understood that further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. An electric displaying device for utilizing a multi-scanning control process is assembled with a plurality of Light Emitting Diode (LED) modules, which are preassembled a plurality of sectional basic LED panels, the electric displaying device comprising:
   a plurality of pixel units consisting of at least three basic LEDs with three primary colors on the sectional basic LED panels,
   a plurality of pixel drivers for controlling corresponding basic LEDs of the pixel units on the sectional basic LED panels,
   a plurality of driver controllers for controlling corresponding pixel drivers on the LED modules,
   a plurality of pixel-driving cells fabricated with the plurality of pixel drivers and driver controllers for controlling the LED module as a whole unit, so that the pixel units disposed along with borders of the sectional basic LED panels assembled in the LED module are controlled as same as a single basic panel,
   a plurality of pixel-driving blocks fabricated with the plurality of pixel-driving cells for controlling the assembly of the LED modules as a whole unit, so that the pixel units disposed along with borders of the assembled LED modules are controlled as same as a single basic panel,
   a plurality of receiving boards for providing the RGB image data and control signal to corresponding pixel drivers, said control signal comprising at least one phase signal as well as synchronizing signal, and said RGB image data comprising at least two pixel data groups corresponding at least two phase stages,
   a multi-scan card for processing said RGB image data and control signal in response to each phase signal at corresponding phase stage to display on corresponding sections of displaying device, in rows, in columns, or in rows and columns, wherein said control signal is formed by two phase signals "phase0" and "phase1", with two and four phase stages, "Phase-A", "Phase-B", "Phase-C" and "Phase-D" for processing multi-scanning process, and
   displayed RGB image data is composed with basic image data generated by basic LEDs of pixel units and intensified image data generated by overlapping the LEDs between neighboring pixel units.

2. An electric displaying device as claimed in claim 1, wherein said pixel units have four LEDs (green G11, red R11, blue B11 and green G'11), each LED being independently and separately connected to the corresponding pixel driver and controlled by the corresponding driver controller.

3. An electric displaying device as claimed in claim 1, wherein each pixel driver further comprises a set of four pixel-driving ICs (D1-D4) for controlling corresponding LEDs.

4. An electric displaying device as claimed in claim 1, wherein each driver controller further composes a set of three driver control ICs (C1-C3) for controlling the pixel-driving ICs, and a control IC (C0) for enabling the driver control IC.

5. An electric displaying device as claimed in claim 1, wherein said receiver board (914) further comprises an input unit (1101) for receiving an addressed image data and control signal, an output unit (1102) for bypassing an unmatched addressed image data and control signal to next receiver board, a buffer unit (1103) for compensating a distortion of the addressed image data and control signal, a series of storing units (1104) for temporarily storing the addressed image data and control signal, a FPGA (1105) for sequentially transmitting the addressed image data and control signal to the corresponding pixel driver, and a PLL IC (1106) for generating a constant frequency.

6. An electric displaying device as claimed in claim 1, wherein said multi-scan card (913) further comprises a TMDS converter (1001) for receiving an input image data and control signal, a CPU (1002) for controlling the system, a PLL IC (1003) for generating a constant frequency, a FPGA (1004) for splitting the image data and control signal and addressing to the corresponding receiver board, a Gamma RAM (1005) for compensating for distortion of the image data and control signal and enhancing resolution, and a series of frame memory units (1006, 1007) for storing each image data and control signal per frame.

7. An electric displaying device as claimed in claim 1, wherein said control signal is formed by one phase signal (phase0) with two phase stages (Phase-A and Phase-B) for processing double-scanning process.

8. A process for performing a multi-scanning control on an electric displaying device assembled with a plurality of Light Emitting Diode (LED) modules that are preassembled with a plurality of sectional basic LED panels and a set of controlling devices, the process comprises the steps of:
   processing the multi-scan card (913) for splitting and distributing the RGB image data and control signal by sections, in rows and columns,
   processing the receiver board (914) for addressing the RGB image data and control signal to the corresponding pixel-driving blocks,
   accessing the RGB image data and control signals to each corresponding pixel unit,
   composing at least one phase signal (phase0) at least two stages (Phase-A, Phase-B),
   scanning each pixel unit for a basic image at Phase A,
   scanning neighboring LEDs between pixel units for double image at Phase B,
   composing the basic image generated by single-scanning and doubled image data generated by overlapping neighboring LEDs along with entire screen, and
   alternating basic image data and doubled image data for corresponding image data and control signals through the entire screen by alternating functions of reading and writing through the series of memory units.

9. A process for performing multi-scanning control as claimed in claim 8, the process further comprises the steps of:
   composing at least two phase signals (phase0, phase1) at least four stages (Phase-A, Phase-B, Phase-C, Phase-D),
   scanning each pixel unit for a basic image at Phase A,
   scanning neighboring LEDs between pixel units for double image at Phase B,
   scanning neighboring LEDs between pixel units for triple image at Phase C, scanning neighboring LEDs between pixel units for multi-image at Phase D, composing the basic image generated by single-scanning and intensified image data generated by overlapping neighboring LEDs along with entire screen, and alternating basic image data and intensified image data for corresponding image data and control signals through the entire screen by alternating functions of reading and writing through the series of memory units.

10. A process for performing multi-scanning control as claimed in claim 8, wherein said operation of the multi-scan card (913) further comprises the steps of:

converting an input analogue video signal and digital control signal received from a PC to a Transition Minimized Differential Signal (TMDS), accessing the TMDS signal to a Field Programmable Gate Array (FPGA), splitting the TMDS signal containing the RGB image signal and control signal according to each receiver address, and distributing the split TMDS image data and control signal to an addressed receiver board.

11. A process for performing multi-scanning control as claimed in claim 8, wherein said operation of the receiver board (914) further comprises the steps of:

receiving addressed image data and control signal containing RGB data and HD, VD and VFS control signals in an input unit (1101), storing the addressed image data and control signal temporarily at a buffer unit (1103), bypassing unmatched addressed image data and control signal to next receiver board, compensating for distortion of addressed image data and control signal, storing the addressed image data and control signal temporarily in a series of storing units (1104), transmitting the addressed image data and control signal sequentially to a corresponding pixel driver though a FPGA (1105), and generating a constant frequency through a PLL IC (1106).

* * * * *